(12) United States Patent
Hidajat et al.

(10) Patent No.: US 9,127,132 B2
(45) Date of Patent: Sep. 8, 2015

(54) PROCESS FOR COAGULATING SULFONATED BLOCK COPOLYMERS

(71) Applicant: Kraton Polymers U.S. LLC, Houston, TX (US)

(72) Inventors: Irwan Hidajat, Katy, TX (US); Gorgonio G. Rodriguez, Jr., Katy, TX (US); Richard Henning, Sealy, TX (US); Guy Andrew Cordonier, Parkersburg, WV (US)

(73) Assignee: Katon Polymers U.S. LLC, Houston, TX (US)

( * ) Notice: Subject to any disclaimer, the term of this patent is extended or adjusted under 35 U.S.C. 154(b) by 67 days.

(21) Appl. No.: 14/048,522

(22) Filed: Oct. 8, 2013

(65) Prior Publication Data

US 2015/0099815 A1    Apr. 9, 2015

(51) Int. Cl.
| | | |
|---|---|---|
| *C08F 12/30* | (2006.01) | |
| *C08F 8/34* | (2006.01) | |
| *C08F 293/00* | (2006.01) | |
| *C08F 255/06* | (2006.01) | |
| *C08J 3/16* | (2006.01) | |
| *C08F 6/06* | (2006.01) | |

(52) U.S. Cl.
CPC ... *C08J 3/16* (2013.01); *C08F 6/06* (2013.01); *C08J 2300/104* (2013.01); *C08J 2353/00* (2013.01)

(58) Field of Classification Search
CPC ......... C08F 8/36; C08F 297/04; B01D 71/28; B01D 71/40; B01D 71/80
USPC ........................ 526/287; 525/333.5, 314, 316
See application file for complete search history.

(56) References Cited

U.S. PATENT DOCUMENTS

| | | | |
|---|---|---|---|
| 3,434,523 | A | 3/1969 | Ceausescu et al. |
| 3,450,795 | A | 6/1969 | Langer |
| 3,577,357 | A | 5/1971 | Winkler |
| 3,642,953 | A | 2/1972 | O'neill et al. |

(Continued)

FOREIGN PATENT DOCUMENTS

| | | |
|---|---|---|
| EP | 0442569 A2 | 8/1991 |
| WO | 8705637 A1 | 8/1987 |

(Continued)

OTHER PUBLICATIONS

International Search Report dated Jan. 16, 2015 for PCT/US2014/059399, filed Oct. 7, 2014.

(Continued)

*Primary Examiner* — William Cheung
(74) *Attorney, Agent, or Firm* — Novak Druce Connolly Bove & Quigg LLP; Michael A. Masse

(57) ABSTRACT

Sulfonated block copolymers (SBCs) are coagulated from SBC solutions in one or more organic solvents, including reaction mixtures obtained in the sulfonation process, by a process in which the SBC solution is ejected into or onto water provided that no steam is added to the SBC solution prior to ejection and provided that the ejection velocity as well as the water temperature and convection are controlled and balanced. The coagulation process is easy to implement and avoids or at least diminishes problems due to foaming and the formation of micro dispersions of the SBC which cannot be separated successfully or easily by conventional filtration or centrifuging.

18 Claims, 5 Drawing Sheets

(56) References Cited

U.S. PATENT DOCUMENTS

| | | |
|---|---|---|
| 3,670,054 A | 6/1972 | De La Mare et al. |
| 3,870,841 A | 3/1975 | Makowski et al. |
| 4,107,236 A | 8/1978 | Naylor et al. |
| 4,492,785 A | 1/1985 | Valint, Jr. et al. |
| 4,505,827 A | 3/1985 | Rose et al. |
| 5,030,672 A | 7/1991 | Hann et al. |
| 5,081,160 A | 1/1992 | Strom et al. |
| 5,239,010 A | 8/1993 | Balas et al. |
| 5,336,737 A | 8/1994 | Ballegooijen et al. |
| 5,468,574 A | 11/1995 | Ehrenberg et al. |
| 5,516,831 A | 5/1996 | Pottick et al. |
| 5,665,858 A | 9/1997 | Van Dijk et al. |
| 6,110,616 A | 8/2000 | Sheikh et al. |
| 6,699,941 B1 | 3/2004 | Handlin, Jr. et al. |
| 6,767,976 B2 | 7/2004 | Hamada et al. |
| 7,169,850 B2 | 1/2007 | Handlin, Jr. et al. |
| 7,737,224 B2 * | 6/2010 | Willis et al. ................ 525/333.5 |
| 2003/0176582 A1 | 9/2003 | Bening et al. |
| 2008/0092773 A1 | 4/2008 | Matsuyama |
| 2008/0113244 A1 | 5/2008 | Yamashita et al. |

FOREIGN PATENT DOCUMENTS

| | | |
|---|---|---|
| WO | 2005068536 A1 | 7/2005 |
| WO | 2009137678 A1 | 11/2009 |
| WO | 2008089332 A3 | 2/2010 |

OTHER PUBLICATIONS

Poling, Bruce E, Prausnitz, John M. and O'Connell, John P., "The Properties of Gases and Liquids," McGraw-Hill Publishing Company, 5th Edition, 2000.

Coates, G.W., Hustad, P.D., Reinartz, S., Chem. Int. Ed., 2002, 41, 2236-2257.

Ed Randel, et al., Fluid-bed dryers: Static versus vibrating, PBE, Apr. 2013.

McCabe, Warren L., et al., "Unit Operations of Chemical Engineering," Fourth Edition, McGraw-Hill Book Company, 1985.

* cited by examiner 0 hours 2 hours 3 hours 4 hours 5 hours 6 hours

PROCESS FOR COAGULATING SULFONATED BLOCK COPOLYMERS

FIELD OF THE INVENTION

The present disclosure relates to a process for separating and coagulating a sulfonated block copolymer from its solution in an organic solvent or mixture of organic solvents which allows large scale operation. In particular, the process can be used as a part of the work-up procedure to separate the sulfonated block copolymer from the reaction mixture in which it is generated. The process removes the organic solvent(s) as well as by-products and impurities which are contained in the reaction mixture and yields the sulfonated block copolymer in form of coagulated copolymer particles which can be further dried and stored or processed.

BACKGROUND OF THE INVENTION

Sulfonated block copolymers (SBCs) are known in the art and described, e.g., in U.S. Pat. No. 3,577,357; U.S. Pat. No. 3,642,953; U.S. Pat. No. 3,870,841; U.S. Pat. No. 4,492,785; U.S. Pat. No. 4,505,827; U.S. Pat. No. 5,239,010; U.S. Pat. No. 5,468,574; U.S. Pat. No. 5,516,831; U.S. Pat. No. 6,110,616; U.S. Pat. No. 7,169,850; U.S. Pat. No. 7,737,224; WO 2008/089332, and WO 2009/137678. They are typically prepared by sulfonating a corresponding non-sulfonated block copolymer in one or more organic solvents using sulfonating agents such as, e.g., sulfur trioxide or acyl sulfates. Since the SBCs are valuable materials, e.g., for the manufacture of membranes and films, coagulation of the SBC from the organic solution frequently is accomplished by directly casting the SBC solution obtained in the sulfonation reaction. E.g., U.S. Pat. Nos. 3,642,953; 5,468,574; U.S. Pat. No. 6,110,616; U.S. Pat. No. 7,169,850; U.S. Pat. No. 7,737,224; WO 2008/089332, and WO 2009/137678. However, the coagulation of the SBC solution via film casting is disadvantageous in various regards. For example, the method is not well suited to post coagulation washing to remove impurities. Additionally, storage of the films or membranes is disadvantageous because the films or membranes are low in bulk density hence requiring more packaging and storage space. Also, when the membrane or film is to be stored in rolled-up form, it is necessary to insert a liner between the rolled layers to prevent sticking which further increases expenditures.

In addition to coagulating the SBCs by way of membrane casting, it has been mentioned that the SBCs can be coagulated by steam stripping the SBC solution and subsequently washing the SBC residue thus obtained with boiling water. E.g., U.S. Pat. No. 5,239,010; U.S. Pat. No. 5,516,831; U.S. Pat. No. 7,169,850; and U.S. Pat. No. 7,737,224. It has been observed, however, that steam stripping causes severe foaming, especially when the SBC is sulfonated to a high degree, which can render this approach unsuited for large scale and economic coagulation of the SBCs.

The coagulation of a non-sulfonated block copolymer from its solution generally can be achieved by one of three methods. Firstly, the solvent(s) can be evaporated by heating the block copolymer to its melting temperature. Secondly, the solution can be combined with steam and the solvent(s) can be evaporated in a cyclone or similar device. Thirdly, the solution can be pre-mixed with steam and the mixture can be ejected into or onto preheated water to evaporate the solvent(s). However, the coagulation methods conventionally used for coagulating a non-sulfonated block copolymer have been found to be inadequate for the coagulation of SBCs from a solution in one or more organic solvents.

The first method has been found to be unsuited for coagulating SBC solutions because SBCs are susceptible to degradation at elevated temperatures, especially when the copolymer solution which is employed is the reaction mixture obtained in the sulfonation of the block copolymer. Additionally, SBCs are more 'sticky' than their non-sulfonated counterparts. Accordingly, when the solvent(s) of the SBC solution are evaporated in a cyclone or similar device, the stickiness of the SBC causes excessive equipment fouling which renders the second method unsuited for coagulating SBC solutions. While premixing the solution with steam as well as ejecting the mixture in form of an atomized stream in accordance with the third procedure facilitates the formation of polymer particles of non-sulfonated block copolymers, the 'stickiness' of the SBCs causes fouling of the ejection nozzles under these conditions. In addition, similar to the problems encountered during steam stripping, excessive foaming occurs when a mixture of steam and the SBC solution is ejected into or onto the preheated water. It has further been observed that the mixture of the SBC, the solvent(s) and the water tends to form a dispersion of the SBC in the form of very small particles which cannot be readily separated by filtration or centrifuging. Coagulation agents which are customarily used in the coagulation of the non-sulfonated counterparts such as, e.g., polyvinyl alcohol and 2-ethylhexanol, have been found to be ineffective to overcome these problems encountered with the SBCs.

Accordingly, there continues to be a need for a process which allows the coagulation of SBCs. Such a process, preferably, should be easy to implement and should avoid or at least diminish the above mentioned problems. The process, also, preferably should be applicable for coagulating a solution of the SBC corresponding to the reaction mixture in which the SBC is generated. It would also be desirable that the process yield the SBC in a form such as particles which are easy to handle and which facilitate storage and further processing of the SBC.

SUMMARY OF THE INVENTION

It has surprisingly been found that an SBC can be coagulated from a solution comprising the SBC in one or more organic solvents, including reaction mixtures obtained in the sulfonation process, by a process in which the SBC solution is ejected into or onto water provided that no steam is added to the SBC solution prior to ejection and provided that the ejection velocity as well as the water temperature and convection (mixing) are controlled and balanced. The coagulation process described herein is easy to implement and avoids or at least diminishes problems due to foaming and the formation of dispersions which cannot be separated successfully or easily by conventional filtration or centrifuging, i.e., micro dispersions. The process disclosed herein also meets the need to provide the SBC in particulate form which is easy to handle and which facilitates storage and further processing of the SBC.

In a first aspect, the present disclosure relates to a process for coagulating a sulfonated block copolymer from a solution comprising the block copolymer and one or more organic solvents, the process comprising
 (a) an ejection stage which comprises ejecting the copolymer solution into or onto moderately stirred water to form a coagulation mixture, wherein
  the ejected copolymer solution is substantially free of steam; and
  the water is at an operating pressure and is at an operating temperature below its boiling point;

and (b) a holding stage which comprises subjecting the coagulation mixture formed in stage (a) to moderate stirring at a holding pressure and at a holding temperature below the boiling point of water for a period sufficient to substantially completely evaporate the one or more organic solvents.

In a second aspect, the present disclosure relates to the process in accordance with the foregoing first aspect, wherein the copolymer solution has a copolymer concentration of about 8 g/l to about 140 g/l.

In a third aspect, the present disclosure relates to the process in accordance with either one of the foregoing first and second aspect, wherein the copolymer solution consists essentially of
from about 0.5 to about 30%-wt. of the copolymer,
from about 60 to about 99.5%-wt. of the one or more organic solvents, and
up to about 10%-wt. of by-products and/or impurities.

In a fourth aspect, the present disclosure relates to the process in accordance with either one of the foregoing aspects one to three, wherein, at the operating pressure, the boiling point of the one or more organic solvents is below the boiling point of water.

In a fifth aspect, the present disclosure relates to the process in accordance with either one of the foregoing aspects one to four, wherein the boiling point of the one or more organic solvents at atmospheric pressure is less than 100° C.

In a sixth aspect, the present disclosure relates to the process in accordance with either one of the foregoing aspects one to five, wherein at least one of the one of more organic solvents of the copolymer solution has one or more of the following properties:
 i) the solvent is a hydrophobic solvent; and/or
 ii) the solvent is an apolar solvent; and/or
 iii) the solvent has a boiling point in the range of from about 45° C. to about 99° C. at standard atmospheric pressure; and/or
 iv) the solvent has a density of at most 1 g/cm$^3$; and/or
 v) at most 2 g of the solvent is soluble in 1 l of water at about 25° C.

In a seventh aspect, the present disclosure relates to the process in accordance with either one of the foregoing aspects one to six, wherein the operating temperature in stage (a) is such that the one or more organic solvents have a vapor pressure which is greater than about 70% of the stage (a) operating pressure.

In an eighth aspect, the present disclosure relates to the process in accordance with either one of the foregoing aspects one to seven, wherein the copolymer solution is ejected continuously or intermittently as a non-atomized stream.

In a ninth aspect, the present disclosure relates to the process in accordance with either one of the foregoing aspects one to eight, wherein the copolymer solution is ejected onto the water surface at a region of the surface having low shear stress.

In a tenth aspect, the present disclosure relates to the process in accordance with either one of the foregoing aspects one to nine, wherein the copolymer solution is ejected at a velocity of from about 0.3 m/s to about 10 m/s.

In an eleventh aspect, the present disclosure relates to the process in accordance with the foregoing tenth aspect, wherein the copolymer solution is ejected at a velocity of from about 0.3 m/s to about 5 m/s.

In a twelfth aspect, the present disclosure relates to the process in accordance with either one of the foregoing aspects one to eleven, wherein the holding temperature in stage (b) is below the boiling point of water at the holding pressure and the holding temperature is equal to, or greater than, the operation temperature in stage (a) when the holding pressure is equal to, or greater than, the operating pressure.

In a thirteenth aspect, the present disclosure relates to the process in accordance with either one of the foregoing aspects one to twelve, for producing a coagulate of the copolymer comprising coagulated copolymer in form of discrete hydrated copolymer particles having a D50 of from about 185 µm to about 25 mm.

In a fourteenth aspect, the present disclosure relates to the process in accordance with the foregoing thirteenth aspect, wherein the D50 is from about 300 µm to about 600 µm.

In a fifteenth aspect, the present disclosure relates to the process in accordance with either one of the foregoing aspects one to fourteen, wherein the copolymer has at least one end block A and at least one interior block B wherein each A block contains essentially no sulfonic acid or sulfonate functional groups and each B block is a polymer block containing from about 10 to about 100 mol-% sulfonic acid or sulfonate functional groups based on the number of monomer units of the B block.

In a sixteenth aspect, the present disclosure relates to the process in accordance with the foregoing fifteenth aspect, wherein each B block comprises segments of one or more vinyl aromatic monomers selected from polymerized (i) unsubstituted styrene monomers, (ii) ortho-substituted styrene monomers, (iii) meta-substituted styrene monomers, (iv) alpha-methylstyrene, (v) 1,1-diphenylethylene, (vi) 1,2-diphenylethylene and (vii) mixtures thereof.

In a seventeenth aspect, the present disclosure relates to the process in accordance with either one of the foregoing aspects fifteen and sixteen, wherein the copolymer has a general configuration A-B-A, A-B-A-B-A, (A-B-A)$_n$X, (A-B)$_n$X, A-D-B-D-A, A-B-D-B-A, (A-D-B)$_n$X, (A-B-D)$_n$X or mixtures thereof, where n is an integer from 2 to about 30, and X is a coupling agent residue and wherein each D block is a polymer block resistant to sulfonation and the plurality of A blocks, B blocks, or D blocks are the same or different.

In an eighteenth aspect, the present disclosure relates to the process in accordance with either one of the foregoing aspects fifteen to seventeen, wherein the copolymer comprises one or more blocks D each block D being independently selected from the group consisting of (i) a polymerized or copolymerized conjugated diene selected from isoprene, 1,3-butadiene having a vinyl content prior to hydrogenation of between 20 and 80 mol percent, (ii) a polymerized acrylate monomer, (iii) a silicon polymer, (iv) polymerized isobutylene and (v) mixtures thereof, wherein any segments containing polymerized 1,3-butadiene or isoprene are subsequently hydrogenated.

Unless specifically indicated otherwise, all technical terms used herein have the meaning as commonly understood by those skilled in the art.

Unless specifically indicated otherwise, the expression "block copolymer" as used herein refers to a copolymer comprising at least one distinct block comprising polymerized vinyl aromatic monomers susceptible to sulfonation and one or more distinct blocks which are resistant to sulfonation. "Resistant to sulfonation" in this context means that little if any sulfonation of the respective block occurs under conditions conventionally employed for sulfonating such block copolymers whereas "susceptible to sulfonation" means that sulfonation is very likely to occur in the referenced block(s) under such conditions. The expressions "resistant to sulfonation" and "susceptible to sulfonation" are meant to express that the degree of sulfonation which occurs, in all instances, is higher in the sulfonation susceptible block(s) than in the sulfonation resistant blocks. For example, upon sulfonation of the block copolymer, the degree of sulfonation in the sulfonation susceptible block(s) is at least about 85%, or is at least about 90%, or is at least about 95%, of the total overall sulfonation of the block copolymer.

Unless specifically indicated otherwise, the expression "sulfonated block copolymer" or "SBC" as used herein refers to a copolymer comprising at least one distinct block comprising polymerized vinyl aromatic monomers which block is sulfonated, and one or more distinct blocks which are essentially free of sulfonation. "Essentially free of sulfonation" in this context means that little if any sulfonation of the respective block has occurred under the conditions conventionally employed for sulfonating the block copolymers. For example, in the sulfonated block copolymer, at least about 85%, or at least about 90%, or at least about 95%, of the total overall sulfonation of the block copolymer is located in the block(s) comprising the (sulfonation susceptible) polymerized vinyl aromatic monomers.

Unless specifically indicated otherwise, the expression "solution" as used herein refers to a liquid, uniformly dispersed mixture at the molecular or ionic level of one or more substances (the solute) in one or more liquid substances (the solvent).

Unless specifically indicated otherwise, the expression "copolymer solution" or "SBC solution" as used herein refers to a liquid, uniformly dispersed mixture at the molecular or ionic level of the SBC in an organic solvent or a mixture of two or more organic solvents. Additionally, the expression "copolymer solution" or "SBC solution" as used herein includes systems in which the SBC is present in colloidal form, i.e., as aggregates or micelles which are too small for resolution with the unaided eye and having an average diameter of less than about 1 μm.

Unless specifically indicated otherwise, the expression "dispersion" as used herein refers to a system having a continuous, liquid phase and at least one discontinuous phase. The discontinuous phase may be made up by solid, finely divided particles and/or by liquid droplets. Where the discontinuous phase(s) is(are) exclusively made up by liquid droplets, the expression "dispersion" in particular encompasses "emulsion." Those having ordinary skill will readily appreciate that there are no sharp differences between dispersions, colloidal or micellar solutions and solutions on a molecular level. Therefore, it will be understood that the demarcation between a solution and a dispersion of the SBC at average particle diameters of about 1 μm which is made herein is arbitrary and merely serves convenience in describing some of the starting materials of the present process.

Unless specifically indicated otherwise, the expression "micro dispersion" as used herein with regard to the coagulation mixture refers to a system in which the SBC particles predominantly are too small to allow commercially practicable separation thereof from the continuous phase by filtration or centrifuging. In general, the SBC particles of such a micro dispersion have a D50 of less than 150 μm, or more particularly less than 100 μm.

Unless specifically indicated otherwise, the expression "D50" as used herein with regard to the SBC particles refers to the mass median diameter or MMD, i.e., 50% of the mass of the SBC are present as particles having a diameter which is equal to or greater than the D50 value.

Unless specifically indicated otherwise, the expression "organic solvent" as used herein refers to any chemical other than water which is liquid under normal conditions (i.e., atmospheric pressure, about 25° C.) and which serves to dissolve the SBC or to dilute the SBC solution, including organic solvents employed to stabilize the SBC solution, e.g., by depressing the freezing point. As such, liquid chemicals are excluded from the expression "organic solvent" to the extent that such chemicals are reactants in the sulfonation procedure or are necessarily formed therein as by-products. For example, an isobutyrate ester may be formed when isobutyryl sulfate is used as the sulfonating agent in the manufacture of the SBC and the reaction mixture is quenched with an alcohol. When such a reaction mixture is employed in the present process, the expression "organic solvent" would not encompass the isobutyrate ester and residual amounts of the quenching alcohol.

Unless specifically indicated otherwise, the expression "hydrophobic" as used herein is meant to express that the solvent or polymer block so characterized repels water or at least does not significantly dissolve in water. With a particular view to the organic solvents, a specific solvent is understood to be hydrophobic if separate phases are observed under normal conditions (atmospheric pressure, about 25° C.) after the solvent has been mixed (moderate mixing such as shaking by hand) with an equal volume of water.

Unless specifically indicated otherwise, the expression "apolar" as used herein with regard to organic solvents is meant to express that the solvent so characterized has a dipole moment μ of at most about 1 J/cm3.

Unless specifically indicated otherwise, the expression "substantially free of steam" as used herein with regard to the ejected stream of SBC solution is meant to express that no extraneous steam is added to the SBC solution prior to ejection.

Unless specifically indicated otherwise, the expression "substantially completely" as used herein with regard to the evaporation of the organic solvent(s) in stage (b) of the process is meant to indicate that at most residual amounts of the solvent(s) are present in the coagulation mixture. Those having ordinary skill in the art will appreciate that any residual amounts of the solvent(s), preferably, should be below a level which would require that the product is classified as a hazardous material. Normally, such residual amount will be at most about 1%-wt., or at most about 0.1%-wt., or less than about 0.05%-wt., of the solvent(s), based on the weight of the product.

Unless specifically indicated otherwise, the expression "by-products and impurities" as used herein with regard to the SBC solution is meant to encompass all chemicals different from the SBC and the organic solvent(s) but which are normally present in the raw reaction mixture which is obtained after sulfonating a block copolymer. Those having ordinary skill will appreciate that such by-products and impurities in particular encompass residual amounts of unconsumed reagents used in the sulfonation reaction, products formed from such reagents other than the SBC as well as impurities normally associated with the reagents, the block copolymer starting material and the organic solvent(s).

Unless specifically indicated otherwise, the expression "non-atomized" as used herein with regard to the ejected stream of copolymer solution is meant to express that the stream is in form of a coherent liquid stream and is essentially free of droplets or spray.

Unless specifically indicated otherwise, the expression "about" as used herein with regard to absolute numerical values is meant to indicate that the respective value may vary, e.g., by ±2%, or more particularly by ±1.5%, or in particular by ±1%. For example, the reference to "about 97° C." inter alia includes [97+(97×0.02)] 98.9° C., and more particularly [97+(97×0.015)] 98.5° C., and in particular [97+(97×0.01)] 98° C.

Unless specifically indicated otherwise, the expression "about" as used herein with regard to upper and lower numerical range limit values is meant to indicate that the respective range limit value may vary, e.g., by ±2%, or more particularly by ±1.5%, or in particular by ±1%, of the respective range. For example, the reference to a range of "from about 1 to about 15%-wt." inter alia includes ranges from [1−(14×0.02)] 0.7%-wt. to [15+(14×0.02)] 15.3%-wt., and more particularly ranges from [1−(14×0.015)] 0.8%-wt. to [15+(14×0.02)] 15.2%-wt., and in particular ranges from [1−(14×0.01)] 0.9%-wt. to [15+(14×0.01)] 15.1%-wt. Those having ordinary skill in the art will appreciate that the lower and upper range limit values may vary independently of one another, i.e., both the lower limit value and the upper limit value are increased or decreased by the respective percentage, or either one of the lower and upper limit values is increased whereas the other one is decreased. It will be recognized, however, that logic and technical feasibility may limit the variance of range limit values. For example, it will be understood that an SBC solution which comprises the SBC in combination with up to about 99%-wt. of organic solvent(s) cannot consist of the solvent(s), i.e., the solvent(s) cannot amount to 100%-wt. of the SBC solution.

Unless specifically indicated otherwise, the expression "hydrated" as used herein with regard to copolymer particles refers to an SBC in particulate form which has absorbed a significant amount of water.

The expression "hp" (horsepower) as used herein refers to mechanical horsepower (also abbreviated as hp (I)), i.e., 1 hp=550 ft×lbF/s.

Unless specifically indicated otherwise, the expression "molecular weight" as used herein and relating to a polymer or a block thereof refers to the number average molecular weight.

The expression "styrene-equivalent molecular weight" as used herein and relating to a block of a block copolymer refers to the molecular weight of the respective block as measured by gel permeation chromatography calibrated with a set of polystyrene standards.

The expression "IEC" as used herein refers to the ion exchange capacity indicated as mol equivalent (meq) of sulfonate groups per gram (g) of the SBC.

Unless specifically stated otherwise, the expression "%-wt." as used herein refers to the number of parts by weight of monomer per 100 parts by weight of polymer on a dry weight basis, or the number of parts by weight of ingredient per 100 parts by weight of a specified composition.

Unless specifically stated otherwise, the expression "%-vol." as used herein refers to the number of parts by volume of one or more liquids per 100 parts by volume of the liquid mixture.

The expression "operating conditions" is used herein as a collective reference to the pressure and temperature conditions during the ejection stage.

The expression "operating pressure" is used herein as a reference to the pressure of the vapor phase in the tank or vessel containing the water and receiving the ejected SBC solution during the ejection stage (a).

The expression "operating temperature" is used herein as a reference to the water temperature during the ejection stage (a).

The expression "holding conditions" is used herein as a collective reference to the pressure and temperature conditions during the holding stage.

The expression "holding pressure" is used herein as a reference to the pressure of the vapor phase in the tank or vessel containing the coagulation mixture during the holding stage (b).

The expression "holding temperature" is used herein as a reference to the temperature of the coagulation mixture during the holding stage (b).

With respect to all ranges disclosed herein, such ranges are intended to include any combination of the mentioned upper and lower limits even if the particular combination is not specifically listed.

All publications, patent applications, and patents mentioned herein are incorporated by reference in their entirety. In the event of conflict, the present specification, including definitions, is intended to control.

BRIEF DESCRIPTION OF THE DRAWINGS

FIG. 2b is an enlarged section of FIG. 2a.

DETAILED DESCRIPTION OF THE INVENTION

Figure 1:
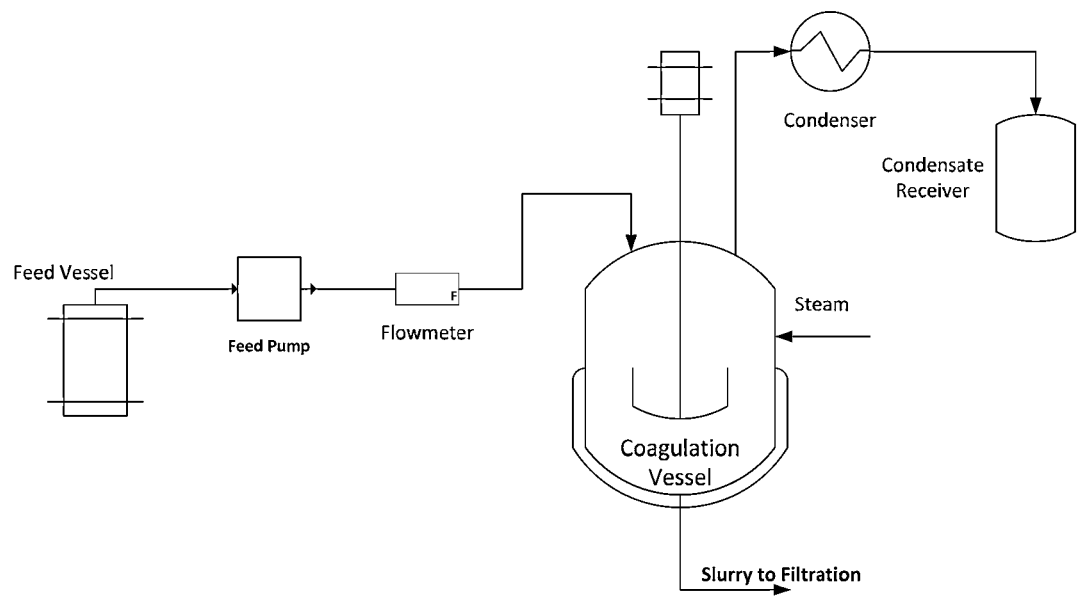
FIG. 1 illustrates a set up suited for conducting the coagulation process.

A detailed description of embodiments of the present process is disclosed herein; however, it is to be understood that the disclosed embodiments are merely exemplary of the process and that the process may be embodied in various and alternative forms of the disclosed embodiments. Therefore, specific structural and functional details which are addressed in the embodiments disclosed herein are not to be interpreted as limiting, but merely as a basis for the claims and as a representative basis for teaching one skilled in the art to variously employ the present process.

The process disclosed herein generally involves an ejection stage (a) and a holding stage (b). During the ejection stage (a), a solution comprising the SBC and one or more organic solvents which is substantially free of steam is ejected into or onto moderately stirred water while the water is at an operating pressure and at an operating temperature which is below the boiling point of the water at the operating pressure.

The concentration of the SBC in the SBC solution is generally not critical with regard to coagulating the SBC but rather is controlled by factors such as the nature of the SBC and the organic solvent(s), and process economy. In consideration of process economy the use of more concentrated solutions is generally preferred. However, at concentrations above a limiting concentration of the SBC in the organic solvent(s), the solution may become highly viscous or may gel and such gelling or high viscosity can interfere with the controlled ejection of the SBC solution, and can increase the risk of fouling and the risk of poor dispersion of the SBC solution. The limiting concentration of a specific SBC in a particular organic solvent or solvent mixture, and the optimum SBC concentration can be determined readily by one having ordinary skill through routine experiments.

In some embodiments of the present process, the SBC solution has an SBC concentration of about 8 g/l to about 140 g/l. In some of the particular aspects of these embodiments, the minimum concentration is at least about 20 g/l, or is at least about 35 g/l, or is at least about 50 g/l. In other particular aspects of these embodiments, the maximum concentration is at most about 130 g/l, or is at most about 120 g/l, or is at most about 110 g/l. Correspondingly, in some of the particular aspects, the SBC concentration of the SBC solution is within a range of from about 20 g/l to about 140 g/l, or from about 35 g/l to about 140 g/l, or from about 50 g/l to about 140 g/l. In other particular aspects, the SBC concentration of the SBC solution is within the range of from 8 g/l to about 130 g/l, or from about 20 g/l to about 130 g/l, or from about 35 g/l to about 130 g/l, or from about 50 g/l to about 130 g/l. In further particular aspects, the SBC concentration of the SBC solution is within the range of from 8 g/l to about 120 g/l, or from about 20 g/l to about 120 g/l, or from about 35 g/l to about 120 g/l, or from about 50 g/l to about 120 g/l. In yet further particular aspects, the SBC concentration of the SBC solution is within the range of from 8 g/l to about 110 g/l, or from about 20 g/l to about 110 g/l, or from about 35 g/l to about 110 g/l, or from about 50 g/l to about 110 g/l.

The nature of the organic solvent or organic solvents present in the SBC solution may vary broadly. Frequently, the nature of the organic solvent or solvents will be influenced by considerations of process economy and safety, and by ecological considerations. For example, from the standpoint of process economy, the organic solvent(s) preferably are those employed in the polymerization of the block copolymer and/or are those which are used to conduct the sulfonation which yields the SBC. With a view to process economy and storage stability of the SBC solution, it may be desirable also that the organic solvent(s) include solvents which depress the freezing (melting) point of the SBC solution, or which control the viscosity of the SBC solution. Moreover, from the standpoint of process and storage economy, the organic solvent or solvents desirably are capable to dissolve high amounts of the SBC, i.e., form a SBC solution which has a high SBC concentration. In the case of mixtures of organic solvents, the involved organic solvents should be miscible with one another at the employed ratio. Other factors which may influence the choice of the solvent(s) include the safety of the solvent(s). Desirably, the involved organic solvent(s) should be safe to handle and not pose health, ecological or processing hazards. Those having ordinary skill in the art will appreciate, however, that considerations of process economy, safety, and ecological considerations are not tantamount to the success of the disclosed coagulation procedure.

In some embodiments, the boiling point of the one or more organic solvents of the SBC solution at the operating pressure is below the boiling point of water at the operating pressure. Those having ordinary skill in the art will appreciate that the boiling point of a mixture of organic solvents is not necessarily identical with the boiling point of the lowest boiling component of the solvent mixture. Accordingly, it will be appreciated also that the pertinent boiling point is the boiling point of the mixture of organic solvents which is present in the SBC solution when the SBC solution contains two or more organic solvents. In some of the particular aspects of these embodiments, the boiling point of the organic solvent(s) at the operating pressure is at least about 3° C. lower than the boiling point of water at the operating pressure. In further embodiments, the boiling point of the organic solvent(s) at the operating pressure is at least about 5° C., or at least about 7° C., or at least about 10° C., lower than the boiling point of water at the operating pressure.

In other embodiments, the boiling point of the solvent or, in the case of two or more solvents, the boiling point of the solvent mixture, at atmospheric pressure is below 100° C. In some of the particular aspects of these embodiments, the boiling point of the organic solvent(s) at atmospheric pressure is at least about 3° C. lower than the boiling point of water at atmospheric pressure. In further embodiments, the boiling point of the organic solvent(s) at atmospheric pressure is at least about 5° C., or at least about 7° C., or at least about 10° C., lower than the boiling point of water at atmospheric pressure.

The boiling points of water and of the one or more organic solvents at the operating pressure or at atmospheric pressure can be determined readily by those having ordinary skill in the art either experimentally or can be estimated using data and calculations known to those skilled in the art and found in standard reference literature such as, e.g., "The Properties of Gases and Liquids", by Bruce E. Poling, John M. Prausnitz, and John P. O'Connell; McGraw-Hill Publishing Company, 5th edition (2000). For determining the boiling point of the one or more organic solvents at the operating pressure or at atmospheric pressure experimentally it is generally sufficient to measure the boiling point of the SBC solution. On the other hand, the boiling point of the one or more organic solvents at the operating pressure or at atmospheric pressure can be estimated on the basis of the vapor pressure of the pure solvents at the respective pressure and their mole fraction in the solution. In this approach, the boiling point of the one or more organic solvent(s) generally is estimated asserting ideal behavior of the involved solvent(s) and neglecting the presence of the SBC and by-products and/or impurities which may be present in the SBC solution. Because the SBC as well as by-products and/or impurities present in the SBC solution have an impact on the actual boiling point of the SBC solution, the boiling point which is determined experimentally may differ from the boiling point of the one or more organic solvents which is estimated on the basis of the vapor pressure of the pure solvents. However, it has been found that such differences normally can be neglected in the context of the present technology.

The organic solvent or solvents may be protic (e.g., alcohols, organic acids, and the like), may be aprotic polar (e.g., ethers, ketons, esters, sulfoxides, asymmetric halogenated hydrocarbons, and the like), or may be apolar (e.g., some symmetric ethers, ketons, esters, sulfoxides, halogenated hydrocarbons, as well as hydrocarbons, and the like). It will be understood by those having ordinary skill that an organic solvent which has functional groups which can react with the sulfonate group of the SBC under the operating conditions, e.g., amino groups, are undesirable unless the goal of the process includes converting the sulfonate group.

In some of the embodiments, the organic solvent(s) include the C5+-alkanes and cycloalkanes, acetone, diethyl ether, diisopropyl ether, dimethoxymethane, ethyl acetate, ethyl formate, isopropyl acetate, methyl acetate, methyl ethyl ketone, and the like, and mixtures thereof. In other embodiments, the organic solvent is a C5+-alkane or cycloalkane (e.g., pentane, straight chained or branched hexane or heptane, or branched octane, cyclopentane, cyclohexane or cycloheptane), or the mixture of organic solvents comprises two or more thereof.

In yet further embodiments, the organic solvent(s) consist(s) essentially of hydrocarbons, halogenated hydrocarbons or mixtures thereof. The organic solvent(s) consist(s) essentially of hydrocarbons and/or halogenated hydrocarbons when such solvent(s) constitute(s) at least about 85%-vol., or at least about 90%-vol., or at least about 95%-vol., or at least about 97%-vol., of the organic solvent(s).

In further embodiments of the present process, at least one of the one or more the organic solvents of the SBC solution has one or more of the following properties (i) to (v):
  i) the solvent is a hydrophobic solvent; and/or
  ii) the solvent is an apolar solvent; and/or
  iii) the solvent has a boiling point in the range of from about 45° C. to about 99° C.; and/or
  iv) the solvent has a density of at most 1 g/cm$^3$; and/or
  v) at most 2 g of the solvent is soluble in 1 l of water at about 25° C.

In some aspects of these embodiments, all of the one or more the organic solvents of the SBC solution have one or more of the foregoing properties (i) to (v).

In some of these aspects, at least one, or all, of the organic solvent(s) of the SBC solution has(have) at least two of the properties (i) to (v). In other aspects, the organic solvent(s) of the SBC solution has(have) at least three of the properties (i) to (v). In further aspects, at least one, or all, of the organic solvent(s) of the SBC solution has(have) at least four of the properties (i) to (v). In yet further aspects, at least one, or all, of the organic solvent(s) of the SBC solution has(have) all of the properties (i) to (v).

In a first particular aspect, at least one, or all, of the organic solvent(s) of the SBC solution at least has(have) the property (i) or (v), and optionally has(have) one or more of the properties (ii) to (iv). In particular, at least one, or all, of the organic solvent(s) at least has(have) the properties (i) and (v), and optionally has(have) one or more of the properties (ii) to (iv). Alternatively, at least one, or all, of the organic solvent(s) at least has(have) the property (i) or (v), and has(have) the property (iv), and optionally has(have) one both of the properties (ii) and (iii). Alternatively, at least one, or all, of the organic solvent(s) at least has(have) the properties (i), (iv) and (v), and optionally has(have) one both of the properties (ii) and (iii).

In second particular aspect of these embodiments, at least one, or all, of the organic solvent(s) of the SBC solution at least has(have) the property (iv), and optionally has(have) one or more of the properties (i) to (iii) and (v). In particular, at least one, or all, of the organic solvent(s) at least has(have) the properties (i) and (iv), and optionally has(have) one or more of the properties (ii), (iii) to (v).

In third particular aspect of these embodiments, at least one, or all, of the organic solvent(s) of the SBC solution at least has(have) the properties (i), (iii) and (iv), and optionally has(have) one or both of the properties (ii) and (v). In particular, at least one, or all, of the organic solvent(s) at least has(have) the properties (i), (iii), (iv) and (v), and optionally has(have) the property (ii).

Where one or more of the organic solvent(s) has(have) the property (iv), the density is in particular no more than about 0.98 g/cm3, or is no more than about 0.95 g/cm3, or is no more than about 0.90 g/cm3, or is no more than about 0.85 g/cm3, or is no more than about 0.80 g/cm3.

Where one or more of the organic solvent(s) has(have) the property (v), the solubility of the solvent in water at 25° C. is in particular less than about 1.5 g/l, or is less than about 1.0 g/l, or is less than about 0.5 g/l, or is less than about 0.1 g/l.

It has been found that by-products and impurities which are normally present in the raw reaction mixture which is obtained after sulfonating the block copolymer are well tolerated in the process in accordance with the present disclosure. Accordingly, the SBC solution which is used in the present process, in some embodiments, consists essentially of, or consists of, the SBC, the organic solvent(s), and optionally by-products and/or impurities. In particular aspects of these embodiments, the SBC solution used in the present process consists essentially of, or consists of
  i) from about 0.5 to about 30%-wt. of the SBC,
  ii) from about 60 to about 99.5%-wt. of the one or more organic solvents, and
  iii) up to about 10%-wt. of by-products and/or impurities.

In further particular aspects of these embodiments, the SBC solution consists essentially of, or consists of
  i) from about 0.8 to about 20%-wt. (or from about 1 to about 15%-wt.) of the SBC,
  ii) from about 71.5 to about 99.2%-wt. (or from about 78 to about 99%-wt.) of the one or more organic solvents, and
  iii) up to about 8.5%-wt. (or up to about 7%-wt.) of by-products and/or impurities.

Accordingly, in yet further embodiments, the SBC solution is a reaction mixture obtained in the sulfonation of the block copolymer, in particular one of the procedures and reaction mixtures as described, e.g., in U.S. Pat. No. 3,577,357; U.S. Pat. No. 3,642,953; U.S. Pat. No. 4,505,827; U.S. Pat. No. 5,239,010; U.S. Pat. No. 5,468,574; U.S. Pat. No. 5,516,831; U.S. Pat. No. 6,110,616; U.S. Pat. No. 7,169,850; U.S. Pat. No. 7,737,224; WO 2008/089332, and WO 2009/137678.

In very particular embodiments, the reaction mixture which is used as the SBC solution in the present process is a reaction mixture as obtained in the sulfonation procedures described in U.S. Pat. No. 3,577,357; U.S. Pat. No. 7,169,850; U.S. Pat. No. 7,737,224; WO 2008/089332, or WO 2009/137678.

WO 2009/137678, for example, describes a sulfonation process in which the sulfonating agent is a C2-C5-acyl sulfate and residual carboxylic acid which is formed in the course of the sulfonation is quenched with a C1-C4-alcohol to form the corresponding C1-C4-alkyl C2-C5-acylate. The reaction mixture obtained by this type of process, thus, comprises in addition to the SBC and the organic solvent(s) used for dissolution and dilution of the polymeric materials (e.g., heptanes, cyclohexane), by-products and impurities including the C2-C5-carboxylic acid, the C1-C4-alcohol, the C1-C4-alkyl C2-C5-acylate, as well as other by-products formed by reaction of the C2-C5-acyl sulfate with the carboxylic acid or the alcohol.

Before the SBC solution is ejected into or onto the water, the water is conditioned by heating the water to the operating temperature at the operating pressure.

The operating pressure is not particularly limited. Those having ordinary skill in the art will appreciate, however, that increasing the operating pressure beyond atmospheric pressure not only increases the boiling point of water but also increases the boiling point of the one or more organic solvents which, in turn, may increase the energy which has to be supplied to the system to evaporate the one or more organic solvents and to coagulate the SBC. On the other hand, decreasing the operating pressure below atmospheric pressure decreases the boiling point of water and the boiling point of the one or more organic solvents and, thus, may decrease the energy which has to be supplied to the system to evaporate the one or more organic solvents and to coagulate the SBC. Accordingly, when the operating pressure is selected with a view to the energy consumption of the process, the operating pressure will normally be at about atmospheric pressure, i.e., about 14.7 psia (pounds per square inch absolute), or below.

Once the operating pressure has been chosen, the operating temperature can be determined based on the boiling point of the one or more organic solvents. In general, the rate at which the organic solvent(s) evaporate(s) and the SBC coagulates increases with increasing operating temperature. Accordingly, in some embodiments the operating temperature will be below the boiling point of water at the operating pressure by at least about 3° C. In other embodiments the operating temperature will be below the boiling point of water at the operating pressure by at least about 5° C., or by at least about 7° C., or by at least about 10° C.

In accordance with various embodiments, the operating temperature is adjusted such that the one or more organic solvents have a collective vapor pressure which is greater than about 70% of the operating pressure. In some of these embodiments, the operating temperature is adjusted such that the collective vapor pressure of the one or more organic solvents is greater than about 75%, or is greater than about 80%, or is greater than about 85%, of the operating pressure.

Vapor pressure for most pure organic solvents can be estimated readily by one skilled in the art using parameters and equations found in numerous reference works, which are well known in the field. One such reference is "The Properties of Gases and Liquids", 5th edition, by Bruce E. Poling, John M. Prausnitz, and John P. O'Connell. The vapor pressure for mixtures of solvents can likewise also be estimated using pure solvent data with parameters and equations found in reference works well known in the field. The preceding reference is also a good source for such solvent mixture vapor pressure estimating techniques.

In accordance with alternative embodiments, the operating temperature is estimated on the basis of the boiling point of the one or more organic solvents at the operating pressure. In accordance with this approach, the estimated operating temperature $T_{H2O}$ is determined using the equation:

$$T_{H2O} \sim (BP_{H2O} + BP_{OS})/2$$

wherein
$BP_{H2O}$ is the boiling point of water at the operating pressure, and
$BP_{OS}$ is the boiling point of the organic solvent(s) of the SBC solution at the operating pressure.

So long as the operating temperature is below the boiling point of water at the operating pressure, the operating temperature at the onset of the ejection stage may be adjusted, e.g., in a range of about ±5° C., or about ±4° C., or about ±3° C., or about ±2.5° C., of the estimated operating temperature $T_{H2O}$. The respective temperature range may be larger when the difference between $BP_{OS}$ and $BP_{H2O}$ is large.

Those having ordinary skill will appreciate that the coagulation process entails evaporating the one or more organic solvents and that the composition of the organic solvents can change in the course of the ejection stage when the SBC solution contains more than one organic solvent, e.g., because one or some of the organic solvents may evaporate more rapidly than another or others. This means that organic solvent(s) which have a low evaporation rate at the operating pressure and temperature can accumulate in the ejection mixture. In some embodiments, such an accumulation may be limited by gradually increasing the water temperature beyond the initial or operating temperature and/or by gradually decreasing the pressure below the initial or operating pressure as the ejection state progresses.

The SBC solution can be ejected through one or more nozzles. To reduce and minimize the formation of a micro dispersion, it has been found advantageous to eject the SBC solution from the nozzle (or each nozzle when multiple nozzles are employed) as a non-atomized stream. The stream can be ejected continuously or intermittently throughout the ejection stage. Accordingly, in some embodiments, the SBC stream is ejected continuously or intermittently as a non-atomized stream throughout the injection stage. Nozzles which are specifically designed to eject fluids in a coherent stream (jets) are known in the art and commercially available.

To reduce and minimize the formation of a micro dispersion and the risk of foaming, it has been found to be advantageous to eject the SBC stream at a low to medium velocity. In some embodiments, the SBC solution is ejected at a velocity of at most about 10 m/s, or at most about 7.5 m/s, or at most about 5 m/s, or at most about 3 m/s, or at most about 2.5 m/s. The lower boundary of the velocity may be varied broadly and is dictated primarily by considerations of process economy as low velocity ejection may result in a reduced overall through-put of the SBC solution. However, one having ordinary skill in the art will appreciate that the through-put rate of the SBC solution at a low ejection velocity can be increased, and the economy of the process can be improved, by increasing the number of the ejection nozzles. In some embodiments, the SBC stream is ejected at a velocity of at least about 0.25 m/s, or at least about 0.3 m/s, or at least about 0.35 m/s, or at least about 0.4 m/s. Accordingly, in some aspects of these embodiments, the ejection velocity ranges from about 0.25 m/s to about 10 m/s, or from about 0.3 m/s to about 10 m/s, or from about 0.35 m/s to about 10 m/s, or from about 0.4 m/s to about 10 m/s. In other aspects, the ejection velocity ranges from about 0.25 m/s to about 7.5 m/s, or from about 0.3 m/s to about 7.5 m/s, or from about 0.35 m/s to about 7.5 m/s, or from about 0.4 m/s to about 7.5 m/s. In yet other aspects, the ejection velocity ranges from about 0.25 m/s to about 5 m/s, or from about 0.3 m/s to about 5 m/s, or from about 0.35 m/s to about 5 m/s, or from about 0.4 m/s to about 5 m/s. In further aspects, the ejection velocity ranges from about 0.25 m/s to about 3 m/s, or from about 0.3 m/s to about 3 m/s, or from about 0.35 m/s to about 3 m/s, or from about 0.4 m/s to about 3 m/s. In yet further aspects, the ejection velocity ranges from about 0.25 m/s to about 2.5 m/s, or from about 0.3 m/s to about 2.5 m/s, or from about 0.35 m/s to about 2.5 m/s, or from about 0.4 m/s to about 2.5 m/s.

During the ejection stage, the SBC solution is ejected into or onto moderately stirred water which is at about the operating temperature. In this context, ejection into the water means that the ejection nozzle orifice is submerged in the water, whereas ejection onto the water means that the ejection nozzle orifice is above the water surface. In some of the particular embodiments, the SBC solution is ejected onto the water surface. In some embodiments it has been observed that ejection of the SBC solution onto the water surface counteracts foaming of the coagulation mixture and reduces the build-up of foam.

Stirring of the water essentially serves to keep temperature fluctuations at the site of contact between the ejected SBC solution and the water to a minimum. Additionally, stirring helps to distribute and shear the SBC solution during contact with the water and influences the particle size of the coagulated SBC thereby facilitating the evaporation of the organic solvent(s). In general, the particle size of the coagulated SBC decreases as the force of stirring increases. If the water is stirred too vigorously, problems due to foaming and micro dispersion of the SBC arise. On the other hand, if stirring is insufficient, the coagulated SBC particles become too large and/or poorly distributed with the water so that the water temperature at a portion of the sites of contact may be decreased and the evaporation of the organic solvent(s) in these regions may be delayed which, in turn, increases the risk of a dispersion which leads to undesirable SBC particle sizes and/or particle size distribution in the water. Additionally, it has been found to be advantageous to control turbulences and shear stress in the stirred water because excessive turbulences and shear stress can contribute to reducing the particle size of the coagulated SBC below filterable dimensions and increase the risk of foaming. On the other hand, some turbulence and shear stress is necessary to adequately distribute the SBC solution within the water and to prevent forming SBC particles which are excessively large and, thus, may be hard to dry. It has been found to be advantageous to eject the SBC solution into a region of the stirred water, or onto a region of the surface of the stirred water, where turbulences and shear stress are at an intermediate intensity which results in a desirable particle size and good distribution of the SBC solution within the water.

For example, when the process is conducted in a stirred tank set-up, the mixing power generally is at most about 0.7 hp/100 gallons of water or coagulation mixture, or is at most about 0.63 hp/100 gallons, or is at most about 0.55 hp/100 gallons, or is at most about 0.47 hp/100 gallons, or is at most about 0.4 hp/100 gallons. On the other hand, to avoid undesirable temperature fluctuations and to control particle size and distribution within the water, the mixing power in such a set-up, generally is at least about 0.01 hp/100 gallons of water or coagulation mixture, or is at least about 0.015 hp/100 gallons, or is at least about 0.02 hp/100 gallons, or is at least about 0.025 hp/100 gallons. Accordingly, in some aspects of these embodiments, the mixing power ranges from about 0.01 to about 0.7 hp/100 gallons, or from about 0.015 to about 0.7 hp/100 gallons, or from about 0.02 to about 0.7 hp/100 gallons, or from about 0.025 to about 0.7 hp/100 gallons. In other aspects, the mixing power ranges from about 0.01 to about 0.63 hp/100 gallons, or from about 0.015 to about 0.63 hp/100 gallons, or from about 0.02 to about 0.63 hp/100 gallons, or from about 0.025 to about 0.63 hp/100 gallons. In yet other aspects, the mixing power ranges from about 0.01 to about 0.55 hp/100 gallons, or from about 0.015 to about 0.55 hp/100 gallons, or from about 0.02 to about 0.55 hp/100 gallons, or from about 0.025 to about 0.55 hp/100 gallons. In further aspects, the mixing power ranges from about 0.01 to about 0.47 hp/100 gallons, or from about 0.015 to about 0.47 hp/100 gallons, or from about 0.02 to about 0.47 hp/100 gallons, or from about 0.025 to about 0.47 hp/100 gallons. In particular aspects of these embodiments, the mixing power ranges from about 0.01 to about 0.4 hp/100 gallons, or from about 0.015 to about 0.4 hp/100 gallons, or from about 0.02 to about 0.4 hp/100 gallons, or from about 0.025 to about 0.4 hp/100 gallons.

Throughout the ejection stage, the water temperature remains elevated to facilitate the evaporation of the organic solvent(s). However, the water temperature is maintained below the boiling point of water at the operating pressure to avoid uncontrollable turbulences associated with boiling which in turn would increase the risk of foaming of the coagulation mixture and could reduce the particle size of the coagulated SBC below filterable dimensions. The water temperature may vary broadly and the optimum temperature will depend on a variety of factors such as the nature and boiling point of the organic solvent or mixture of organic solvents of the SBC solution, the operating pressure, and the mixing power. In general, the water temperature will be maintained during the ejection stage within a range of from about the operating temperature to about 3° C. below the boiling point of water at the operating pressure.

The water temperature can be controlled in a conventional manner, i.e., by injecting steam into the water, by heating the reactor jacket, via a heating heating/cooling coil immersed in the water, and/or circulation through a heat exchanger.

The amount of the SBC solution which is ejected into or onto the water can vary broadly and, aside from economic considerations and process set-up, will generally depend upon the nature of the SBC (the degree of sulfonation), the nature of the organic solvent(s), and the concentration of the SBC in the organic solvent(s). The coagulation mixture which forms when the SBC solution is ejected into or onto the water and the organic solvent(s) evaporates takes the form of a slurry of coagulated and hydrated SBC particles in water and the amount of the SBC solution will be adjusted depending on the solids content and processability of the coagulation mixture. If the solids content is too high the coagulation mixture may become difficult to handle, e.g., when the coagulation mixture is to be pumped from a coagulation tank. On the other hand, if the solids content is too low, the process is less economic. In some embodiments, where the SBC has an ion exchange capacity (IEC) of about 2 meq/g, the suitable solids content of the coagulation mixture is normally at most about 5%-wt., or at most about 4%-wt. When the IEC of the SBC is lower, the suitable solids content of the coagulation mixture may be higher whereas the suitable solids content may be lower when the IEC of the SBC is higher.

After ejection of the SBC solution has concluded, the resulting coagulation mixture is subjected to a holding stage during which moderate stirring of the coagulation mixture is maintained at about the level used during the ejection stage.

Throughout the holding stage, the water temperature is maintained at an elevated level to substantially complete the evaporation of the organic solvent(s). However, the water temperature, again, is maintained below the boiling point of water at the holding pressure to avoid turbulences associated with boiling which in turn increase the risk of foaming of the coagulation mixture and reduction of the SBC particle size below filterable levels. The water temperature may vary and the optimum temperature during the holding stage, also, depends primarily on the nature and boiling point of the organic solvent or solvents remaining in the coagulation mixture after the ejection stage. In general, the water temperature during the holding stage will be within a range of from about the operating temperature to about 3° C. below the boiling point of water at the holding pressure.

The holding pressure normally will be equal to or below the operating pressure to facilitate the evaporation of the remaining organic solvent(s).

In general, the holding temperature in stage (b) is below the boiling point of water at the holding pressure. In other embodiments, the holding temperature in stage (b) is equal to, or greater than, the operating temperature in stage (a) when the holding pressure is equal to, or greater than, the operating pressure.

The duration of the holding stage can vary broadly and will depend on the amount and concentration of ejected SBC solution, the ejection velocity and the nature of the organic solvent(s), in particular the nature and amounts of higher boiling solvent fractions within the organic solvent(s). For example, a prolonged holding stage may be required after large amounts of SBC solution have been ejected, and/or when the concentration of the ejected SBC solution was low, and/or when the SBC solution was ejected at a higher velocity. A prolonged holding stage, also, may be advisable when the organic solvent(s) include one of more fractions which have a boiling point close to or above the boiling point of water. In some embodiments it has been found to be advantageous to alternate between the ejection stage and the holding stage such that an initial part of the SBC solution is ejected, the so formed first coagulation mixture is subjected to a first holding stage. Subsequently, a further part of the SBC solution is ejected into the first coagulation mixture and the further concentrated coagulation mixture is subjected to a second holding stage, and so on. Conducting the coagulation process by alternating between the ejection stage and the holding stage may be advantageous when the SBC solution has a low SBC concentration and/or when a large amount of the SBC solution per the amount of water is to be processed.

After the holding stage, or the final holding stage, the coagulation mixture is in form of a white slurry which contains the coagulated SBC in form of hydrated particles having a mass median diameter (D50) of from about 185 µm to about 25 mm. In some embodiments, the D50 of the hydrated particles is at least about 200 µm, or is at least about 250 µm, or is at least about 300 µm, or is at least about 350 µm, or is at least about 400 µm. In some embodiments, the D50 of the hydrated particles is at most about 20 mm, or is at most about 14 mm, or is at most about 8 mm, or is at most about 1 mm, or is at most about 600 µm. Accordingly, in some aspects of these embodiments, the D50 of the hydrated particles ranges from about 200 µm to about 25 mm, or from about 250 µm to about 25 mm, or from about 300 µm to about 25 mm, or from about 350 µm to about 25 mm, or from about 400 µm to about 25 mm. In other aspects, the D50 of the hydrated particles ranges from about 185 µm to about 20 mm, or from about 200 µm to about 20 mm, or from about 250 µm to about 20 mm, or from about 300 µm to about 20 mm, or from about 350 µm to about 20 mm, or from about 400 µm to about 20 mm. In yet other aspects, the D50 of the hydrated particles ranges from about 185 µm to about 14 mm, or from about 200 µm to about 14 mm, or from about 250 µm to about 14 mm, or from about 300 µm to about 14 mm, or from about 350 µm to about 14 mm, or from about 400 µm to about 14 mm. In further aspects, the D50 of the hydrated particles ranges from about 185 µm to about 8 mm, or from about 200 µm to about 8 mm, or from about 250 µm to about 8 mm, or from about 300 µm to about 8 mm, or from about 350 µm to about 8 mm, or from about 400 µm to about 8 mm. In yet further aspects, the D50 of the hydrated particles ranges from about 185 µm to about 1 mm, or from about 200 µm to about 1 mm, or from about 250 µm to about 1 mm, or from about 300 µm to about 1 mm, or from about 350 µm to about 1 mm, or from about 400 µm to about 1 mm. In particular aspects, the D50 of the hydrated particles ranges from about 185 µm to about 600 µm, or from about 200 µm to about 600 µm, or from about 250 µm to about 600 µm, or from about 300 µm to about 600 µm, or from about 350 µm to about 600 µm, or from about 400 µm to about 600 µm.

The particle form can be spheroid or pellet like. It has been observed that pellet shaped particles are formed in the process at the higher end of the average particle sizes whereas predominantly spherical particles are formed at median or low particle sizes. Depending on the average particle size, the coagulated SBC particles can be separated from the coagulation mixture by conventional filtration equipment such as centrifuges, filter presses, belt presses and the like.

After separation from the coagulation mixture, the hydrated SBC particles contain significant amounts of water, e.g., more than about 75%-wt., or more than about 80%-wt., or more than about 85%-wt. In some embodiments, the hydrated SBC particles can entrain up to about 94%-wt., or up to about 92%-wt., or up to 90%-wt., or up to about 88%-wt. of water. Accordingly, in some of these embodiments, the hydrated SBC particles entrain from about 75%-wt. to about 94%-wt., or from about 80%-wt. to about 94%-wt., or from about 85%-wt. to about 94%-wt. of water. In other embodiments, the hydrated SBC particles entrain from about 75%-wt. to about 92%-wt., or from about 80%-wt. to about 92%-wt., or from about 85%-wt. to about 92%-wt. of water. In further embodiments, the hydrated SBC particles entrain from about 75%-wt. to about 90%-wt., or from about 80%-wt. to about 90%-wt., or from about 85%-wt. to about 90%-wt. of water. In yet further embodiments, the hydrated SBC particles entrain from about 75%-wt. to about 88%-wt., or from about 80%-wt. to about 88%-wt., or from about 85%-wt. to about 88%-wt. of water.

To improve the flowability of the SBC particles and to reduce the storage weight and volume, the hydrated SBC particles normally will be dried at least partially, or can be dried to constant weight. To increase the surface area and, thus, drying efficiency the wet cake of hydrated SBC particles which has been separated from the coagulation mixture can be further granulated using conventional granulation equipment such as cone mills and the like. The hydrated SBC particles are then dried using conventional drying chambers known to those having ordinary skill optionally using a reduced pressure and/or elevated temperature such as, e.g., tray dryers, Wyssmont dryers, vibrating fluidized bed dryers and the like. Depending on the drying equipment and conditions, the dried SBC particles contain at most about 15%-wt., or at most about 10%-wt., or at most about 5%-wt., or at most about 2%-wt. of residual water after drying to constant weight.

The process can be carried out batch wise, semi-batch wise or continuous and can be implemented using conventional process equipment.

Suitable vessels or tanks for conducting the ejection and holding stage of the process are known to those having ordinary skill, e.g., a stirred vessel. The vessel can be jacketed heated with steam, tempered water, hot oil or other heating medium, or without jacket. If the vessel is without a jacket, then it needs to have a heating coil or direct steam injection or external heat exchanger with circulation loop. The vessel needs to be equipped with a condenser to condense the vapor.

Suitable mixers are those that will distribute the SBC solution with reasonable uniformity throughout the water without creating excessive shear stresses or turbulence. Such mixers are known to those having ordinary skill and include various manifestations of turbine, propeller, anchor, paddle, helical mixer types, and the like. Mixers that create very high local shearing and/or do not uniformly mix the coagulation mixture are not optimal for this process.

Any nozzle that does not produce mist, spray, or excessively small droplets can be used for ejecting the SBC solution. The nozzle should not produce droplets which are smaller than those which are created when mixing the ejection mixture in the vessel. The feed nozzle can be as simple as a small tube or a small orifice that produces a continuous or intermittent feed stream at an appropriate velocity, i.e., a velocity that does not itself create excessive shear or turbulence, resulting in micro-dispersion of all or a portion of the SBC solution.

The process allows coagulating a broad variety of SBCs provided, of course, that the SBC is not soluble in water.

In some embodiments, the SBC comprises at least one end block A and at least one interior block B wherein each A block contains essentially no sulfonic acid or sulfonate functional groups and each B block is a polymer block containing from about 10 to about 100 mol-% sulfonic acid or sulfonate functional groups based on the number of monomer units of the B block. In particular embodiments, the SBC comprises at least two end blocks A and at least one interior block B. Such SBCs are described, e.g., in U.S. Pat. No. 7,737,224; WO 2008/089332, and WO 2009/137678.

Each of the A blocks of such SBCs generally comprises one or more segments selected from polymerized (i) para-substituted styrene monomers, (ii) ethylene, (iii) alpha olefins of 3 to 18 carbon atoms; (iv) 1,3-cyclodiene monomers, (v) monomers of conjugated dienes having a vinyl content less than 35 mol-% prior to hydrogenation, (vi) acrylic esters, (vii) methacrylic esters, and (viii) mixtures thereof, wherein any segments containing polymerized 1,3-cyclodiene or conjugated dienes are subsequently hydrogenated. In some of the particular aspects, any A block comprising polymerized ethylene (ii) or hydrogenated polymers of a conjugated, acyclic diene (v) have a melting point greater than 50° C., preferably greater than 80° C. In some embodiments, each of the A blocks is selected from the group consisting of polymerized (ii) ethylene, and (v) conjugated dienes having a vinyl content less than 35 mol-% prior to hydrogenation wherein the conjugated dienes are subsequently hydrogenated. In other embodiments, each of the A blocks is selected from the group consisting of polymerized (i) para-substituted styrene monomers, and (ii) 1,3-cyclodiene monomers wherein the 1,3-cyclodiene monomers are subsequently hydrogenated. In yet other embodiments, each of the A blocks is a segment of one or more polymerized para-substituted styrene monomers. Those having ordinary skill in the art will appreciate that multiple A blocks of the SBC may be identical or may differ in the nature of the polymer segments.

The para-substituted styrene monomers are selected from para-methylstyrene, para-ethylstyrene, para-n-propylstyrene, para-iso-propylstyrene, para-n-butylstyrene, para-sec-butylstyrene, para-iso-butylstyrene, para-t-butylstyrene, isomers of para-decylstyrene, isomers of para-dodecylstyrene and mixtures of the above monomers. Preferred para-substituted styrene monomers are para-t-butylstyrene and para-methylstyrene, with para-t-butylstyrene being most preferred. Monomers may be mixtures of monomers, depending on the particular source. Preferably, the overall purity of the para-substituted styrene monomers is at least 90%-wt., or is at least 95%-wt., or is at least 98%-wt.

Blocks A which are polymers of ethylene can be polymerized via a Ziegler-Natta process, as taught in the references in the review article by G. W. Coates, P. D. Hustad, and S. Reinartz in Angew. Chem. Int. Ed., 2002, 41, 2236-2257. Alternatively, the ethylene blocks can be obtained using anionic polymerization as taught in U.S. Pat. No. 3,450,795.

Blocks A which are polymers of alpha olefins of 3 to 18 carbon atoms also can be prepared via a Ziegler-Natta process, as taught in the references in the review article by G. W. Coates et al, as cited above. Preferred alpha olefins include propylene, butylene, hexane and octene, with propylene being most preferred.

When the A block is a hydrogenated polymer of 1,3-cyclodiene monomers, such monomers are selected from the group consisting of 1,3-cyclohexadiene, 1,3-cycloheptadiene and 1,3-cyclooctadiene. Preferably, the cyclodiene monomer is 1,3-cyclohexadiene. Polymerization of such cyclodiene monomers is disclosed in U.S. Pat. No. 6,699,941. It will be necessary to hydrogenate the A blocks when using cyclodiene monomers since unhydrogenated polymerized cyclodiene blocks would be susceptible to sulfonation.

When the A block is a hydrogenated polymer of conjugated acyclic dienes having a vinyl content less than 35 mol-% prior to hydrogenation, it is preferred that the conjugated diene is 1,3-butadiene or isoprene. It is necessary that the vinyl content of the polymer prior to hydrogenation be less than 35 mol-%, preferably less than 30 mol-%. In certain embodiments, the vinyl content of the polymer prior to hydrogenation will be less than 25 mol-%, even more preferably less than 20 mol-%, and even less than 15 mol-% with one of the more advantageous vinyl contents of the polymer prior to hydrogenation being less than 10 mol-%. Such A blocks having a crystalline structure, similar to that of polyethylene, are disclosed, e.g., in U.S. Pat. No. 3,670,054 and U.S. Pat. No. 4,107,236.

The A block may also be a polymer of acrylic esters or methacrylic esters. These polymer blocks can be made according to the methods disclosed in U.S. Pat. No. 6,767,976. Specific examples of the methacrylic ester include esters of a primary alcohol and methacrylic acid, such as methyl methacrylate, ethyl methacrylate, propyl methacrylate, n-butyl methacrylate, isobutyl methacrylate, hexyl methacrylate, 2-ethylhexyl methacrylate, dodecyl methacrylate, lauryl methacrylate, methoxyethyl methacrylate, dimethylaminoethyl methacrylate, diethylaminoethyl methacrylate, glycidyl methacrylate, trimethoxysilylpropyl methacrylate, trifluoromethyl methacrylate, trifluoroethyl methacrylate; esters of a secondary alcohol and methacrylic acid, such as isopropyl methacrylate, cyclohexyl methacrylate and isobornyl methacrylate; and esters of a tertiary alcohol and methacrylic acid, such as tert-butyl methacrylate. Specific examples of the acrylic ester include esters of a primary alcohol and acrylic acid, such as methyl acrylate, ethyl acrylate, propyl acrylate, n-butyl acrylate, isobutyl acrylate, hexyl acrylate, 2-ethylhexyl acrylate, dodecyl acrylate, lauryl acrylate, methoxyethyl acrylate, dimethylaminoethyl acrylate, diethylaminoethyl acrylate, glycidyl acrylate, trimethoxysilylpropyl acrylate, trifluoromethyl acrylate, trifluoroethyl acrylate; esters of a secondary alcohol and acrylic acid, such as isopropyl acrylate, cyclohexyl acrylate and isobornyl acrylate; and esters of a tertiary alcohol and acrylic acid, such as tert-butyl acrylate. If necessary, as raw material or raw materials, one or more of other anionic polymerizable monomers may be used together with the (meth)acrylic ester in the present invention. Examples of the anionic polymerizable monomer that can be optionally used include methacrylic or acrylic monomers such as trimethylsilyl methacrylate, N-isopropylmethacrylamide, N-tert-butylmethacrylamide, trimethylsilyl acrylate, N-isopropylacrylamide, and N-tert-butylacrylamide. Further, suitable monomers include multifunctional anionic polymerizable monomers having two or more acryl or methacryl moieties, such as acrylic and methacrylic ester groups (for example, ethylene glycol diacrylate, ethylene glycol dimethacrylate, 1,4-butanediol diacrylate, 1,4-butanediol dimethacrylate, 1,6-hexanediol diacrylate, 1,6-hexanediol dimethacrylate, trimethylolpropane triacrylate and trimethylolpropane trimethacrylate).

The A blocks may also contain up to about 15 mol-% of the vinyl aromatic monomers mentioned herein below for the B blocks. In some embodiments, the A blocks contain at most about 10 mol-%, preferably they contain at most about 5 mol-%, and particularly preferably at most about 2 mol-% of the vinyl aromatic monomers. Accordingly, the sulfonation level in the A blocks may be from 0 up to about 15 mol-% of the total monomers in the A block, or may be from 0 up to about 10 mol-%, or may be from 0 up to about 5 mol-%, or may be from 0 up to about 2 mol-%. However, in the most preferred embodiments, the A blocks will be free of the vinyl monomers mentioned for the B blocks and the A blocks will be substantially free of sulfonation.

Generally, each of the A blocks independently has a number average molecular weight of from about 1,000 to about 60,000. Preferably each A block has a number average molecular weight of from about 2,000 to about 50,000, more preferably from about 3,000 to about 40,000 and even more preferably from about 3,000 to about 30,000.

The blocks A of the SBC, taken together, generally constitute at least about 8 mol-%, or at least about 10 mol-%, or at least about 15 mol-%, or at least about 20 mol-% of the SBC.

However, in most of the embodiments the blocks A constitute at most about 80 mol-%, or at most about 70 mol-%, or at most about 60 mol-%, or at most about 50 mol-% of the SBC. Accordingly, in some embodiments the blocks A of the SBC contribute from about 8 mol-% to about 80 mol-%, or from about 10 mol-% to about 80 mol-%, or from about 15 mol-% to about 80 mol-%, or from about 20 mol-% to about 80 mol-%. In other embodiments the blocks A of the SBC contribute from about 8 mol-% to about 70 mol-%, or from about 10 mol-% to about 70 mol-%, or from about 15 mol-% to about 70 mol-%, or from about 20 mol-% to about 70 mol-%. In further embodiments the blocks A of the SBC contribute from about 8 mol-% to about 60 mol-%, or from about 10 mol-% to about 60 mol-%, or from about 15 mol-% to about 60 mol-%, or from about 20 mol-% to about 60 mol-%. In particular embodiments the blocks A of the SBC contribute from about 8 mol-% to about 50 mol-%, or from about 10 mol-% to about 50 mol-%, or from about 15 mol-% to about 50 mol-%, or from about 20 mol-% to about 50 mol-%.

Each of the B blocks of the SBCs comprises segments of one or more polymerized vinyl aromatic monomers selected from unsubstituted styrene monomer, ortho-substituted styrene monomers, meta-substituted styrene monomers, alpha-methylstyrene monomer, 1,1-diphenylethylene monomer, 1,2-diphenylethylene monomer, and mixtures thereof. In addition, the B blocks may also comprise a hydrogenated copolymer of such monomer(s) with a conjugated diene selected from 1,3-butadiene, isoprene and mixtures thereof, having a vinyl content of between 20 and 80 mol-%. Copolymer blocks comprising hydrogenated dienes may be random copolymer blocks, tapered copolymer blocks, blocky copolymer blocks or controlled distribution copolymer blocks. Accordingly, in some of the embodiments, the SBC comprises one or more B blocks which are copolymers of the vinyl aromatic monomers and hydrogenated conjugated dienes. In a particular aspect of these embodiments, all B blocks of the SBC are copolymers of the vinyl aromatic monomers and hydrogenated conjugated dienes. B blocks having a controlled distribution structure are described, e.g., in US 2003/0176582. In other embodiments, each of the B blocks of the SBC is a block of one or more of the aforementioned vinyl aromatic monomers. In some particular embodiments, the SBC includes at least one B block of polymerized unsubstituted styrene monomers. In other particular embodiments, all of the B blocks of the SBC are polymers of unsubstituted styrene monomers.

The vinyl aromatic monomers generally constitute at least about 5 mol-%, or at least about 10 mol-%, or at least about 15 mol-%, or at least about 20 mol-%, or at least about 25 mol-%, of the SBC. Normally, the mol-percentage of the vinyl aromatic monomers in the SBC will be at most about 90 mol-%, or at most about 85 mol-%, or at most about 80 mol-%, or at most about 75 mol-%, or at most about 70 mol-%. Accordingly, in some of these embodiments, the amount of the vinyl aromatic monomers in the SBC ranges from about 5 mol-% to about 90 mol-%, or from about 10 mol-% to about 90 mol-%, or from about 15 mol-% to about 90 mol-%, or from about 20 mol-% to about 90 mol-%, or from about 25 mol-% to about 90 mol-%. In other embodiments, the amount of the vinyl aromatic monomers in the SBC ranges from about 5 mol-% to about 85 mol-%, or from about 10 mol-% to about 85 mol-%, or from about 15 mol-% to about 85 mol-%, or from about 20 mol-% to about 85 mol-%, or from about 25 mol-% to about 85 mol-%. In yet other embodiments, the amount of the vinyl aromatic monomers in the SBC ranges from about 5 mol-% to about 80 mol-%, or from about 10 mol-% to about 80 mol-%, or from about 15 mol-% to about 80 mol-%, or from about 20 mol-% to about 80 mol-%, or from about 25 mol-% to about 80 mol-%. In further embodiments, the amount of the vinyl aromatic monomers in the SBC ranges from about 5 mol-% to about 75 mol-%, or from about 10 mol-% to about 75 mol-%, or from about 15 mol-% to about 75 mol-%, or from about 20 mol-% to about 75 mol-%, or from about 25 mol-% to about 75 mol-%. In yet further embodiments, the amount of the vinyl aromatic monomers in the SBC ranges from about 5 mol-% to about 70 mol-%, or from about 10 mol-% to about 70 mol-%, or from about 15 mol-% to about 70 mol-%, or from about 20 mol-% to about 70 mol-%, or from about 25 mol-% to about 70 mol-%.

Correspondingly, in some embodiments, the amount of the vinyl aromatic monomers in the B block(s) ranges from about 10 to about 100 mol-%, or from about 25 to about 100 mol-%, or from about 50 to about 100 mol-%, or from about 75 to about 100 mol-%, or from 90 to 100 mol-%. In particular embodiments, the amount of the vinyl aromatic monomers in the B block(s) is 100 mol-%.

The level of sulfonation (i.e., mol of sulfonic acid or sulfonate functional groups per mol of polymerized vinyl aromatic monomer) of each B block, generally is from about 10 to 100 mol-%. In some embodiments, the level of sulfonation is at least about 15 mol-%, or is at least about 20 mol-%, or is at least about 25 mol-%, or is at least about 30 mol-%, or is at least about 35 mol-%. In some embodiments, the level of sulfonation is at most about 95 mol-%, or is at most about 90 mol-%, or is at most about 85 mol-%, or is at most about 80 mol-%, or is at most about 75 mol-%. Accordingly, in some aspects of these embodiments, the sulfonation level of the B block(s) is from about 15 mol-% to about 100 mol-%, or from about 20 mol-% to about 100 mol-%, or from about 25 mol-% to about 100 mol-%, or from about 30 mol-% to about 100 mol-%, or from about 35 mol-% to about 100 mol-%. In other aspects, the sulfonation level of the B block(s) is from about 15 mol-% to about 95 mol-%, or from about 20 mol-% to about 95 mol-%, or from about 25 mol-% to about 95 mol-%, or from about 30 mol-% to about 95 mol-%, or from about 35 mol-% to about 95 mol-%. In yet other aspects, the sulfonation level of the B block(s) is from about 15 mol-% to about 90 mol-%, or from about 20 mol-% to about 90 mol-%, or from about 25 mol-% to about 90 mol-%, or from about 30 mol-% to about 90 mol-%, or from about 35 mol-% to about 90 mol-%. In further aspects, the sulfonation level of the B block(s) is from about 15 mol-% to about 85 mol-%, or from about 20 mol-% to about 85 mol-%, or from about 25 mol-% to about 85 mol-%, or from about 30 mol-% to about 85 mol-%, or from about 35 mol-% to about 85 mol-%. In yet further aspects, the sulfonation level of the B block(s) is from about 15 mol-% to about 80 mol-%, or from about 20 mol-% to about 80 mol-%, or from about 25 mol-% to about 80 mol-%, or from about 30 mol-% to about 80 mol-%, or from about 35 mol-% to about 80 mol-%. In particular aspects, the sulfonation level of the B block(s) is from about 15 mol-% to about 75 mol-%, or from about 20 mol-% to about 75 mol-%, or from about 25 mol-% to about 75 mol-%, or from about 30 mol-% to about 75 mol-%, or from about 35 mol-% to about 75 mol-%.

Generally, each B block independently has a number average molecular weight of from about 10,000 to about 300,000, or of from about 15,000 to about 250,000, or of from about 20,000 to about 200,000, or of from about 30,000 to about 100,000

In some embodiments, the SBC comprises at least one end block A, at least one interior block B and at least one sulfonation resistant interior and/or end block D. In some aspects of these embodiments, the SBC has at least one end block D. In other aspects, the SBC has at least one interior block D. In particular aspects of these embodiments, the SBC has at least two end blocks A and no end block D.

Each of the D blocks of the SBCs generally comprises one or more segments selected from (i) polymerized or copolymerized conjugated dienes having a vinyl content prior to hydrogenation of between 20 and 80 mol-%, (ii) polymerized acrylate monomers, (iii) a silicon polymer, (iv) polymerized isobutylene and (v) mixtures thereof, wherein any segments containing polymerized conjugated dienes are subsequently hydrogenated.

Suitable conjugated dienes include, e.g., butadiene, isoprene, and the like, as well as 1,3-cyclodiene monomers, such as 1,3-cyclohexadiene, 1,3-cycloheptadiene and 1,3-cyclooctadiene, preferably 1,3-cyclohexadiene.

Examples of suitable (meth)acrylic ester for the D block(s) include esters of a primary alcohol and (meth)acrylic acid, such as propyl(meth)acrylate, n-butyl (meth)acrylate, isobutyl(meth)acrylate, hexyl(meth)acrylate, 2-ethylhexyl(meth)acrylate, dodecyl(meth)acrylate, lauryl(meth)acrylate, methoxyethyl(meth)acrylate; esters of a secondary alcohol and (meth)acrylic acid, such as isopropyl(meth)acrylate, cyclohexyl(meth)acrylate and isobornyl(meth)acrylate; and esters of a tertiary alcohol and (meth)acrylic acid, such as tert-butyl (meth)acrylate. If necessary, as raw material or raw materials, one or more of other anionic polymerizable monomers may be used together with the (meth)acrylic ester in the present invention. Moreover, there may be used a multifunctional anionic polymerizable monomer having in the molecule thereof two or more methacrylic or acrylic structures, such as (meth)acrylic ester structures, for example, ethylene glycol di(meth)acrylate, 1,4-butanediol di(meth)acrylate, 1,6-hexanediol di(meth)acrylate, and trimethylolpropane tri(meth)acrylate. Such polymer blocks can be made according to the methods disclosed in U.S. Pat. No. 6,767,976.

Additionally, the D blocks may be polymer blocks of silicon rubber segments, i.e., blocks of organopolysiloxanes having recurring units of —[Si(R)2-O]— wherein R denotes an organic radical, e.g., alkyl, cycloalkyl or aryl.

The D blocks may also contain up to about 15 mol-% of the vinyl aromatic monomers for the B blocks. In some embodiments, the D blocks contain at most about 10 mol-%, preferably they contain at most about 5 mol-%, and particularly preferably at most about 2 mol-% of the vinyl aromatic monomers. Accordingly, the sulfonation level in the D blocks may be from 0 up to about 15 mol-% of the total monomers in the D block, or may be from 0 up to about 10 mol-%, or may be from 0 up to about 5 mol-%, or may be from 0 up to about 2 mol-%. However, in the most preferred embodiments, the D blocks will be free of the vinyl monomers mentioned for the B blocks and the D blocks will be substantially free of sulfonation.

In some of the particular embodiments, each of the blocks D is a hydrogenated homopolymer of butadiene or isoprene.

In general, each of the D blocks has a glass transition temperature of less than 20° C. and a number average molecular weight of between 1,000 and 50,000.

In some of the embodiments, the SBC has a general configuration A-B-A, A-B-A-B-A, (A-B-A)nX, (A-B)nX, A-D-B-D-A, A-B-D-B-A, (A-D-B)nX, (A-B-D)nX or mixtures thereof, where n is an integer from 2 to about 30, and X is a coupling agent residue and wherein the plurality of A blocks, B blocks, or D blocks are the same or different. In some particular aspects of these embodiments, the SBC is a penta- or hexa-block copolymer of the configuration A-B-A-B-A, (A-B-A)nX, (A-B)nX, A-D-B-D-A, A-B-D-B-A, (A-D-B)nX, (A-B-D)nX, or mixtures thereof. In other particular aspects of these embodiments, the SBC is a penta-block copolymer of the configuration A-B-A-B-A, A-D-B-D-A, A-B-D-B-A, or mixtures thereof. In further particular aspects of these embodiments, the SBC has a general configuration A-D-B-D-A, A-B-D-B-A, (A-D-B)nX, (A-B-D)nX or mixtures thereof. In yet further particular aspects of these embodiments, the SBC is a penta- or hexa-block copolymer of general configuration A-D-B-D-A, A-B-D-B-A, (A-D-B)$_n$X, (A-B-D)$_n$X or mixtures thereof. In very particular embodiments, the SBC is a penta-block copolymer of the configuration A-D-B-D-A, A-B-D-B-A, or mixtures thereof.

Illustrative Examples

A series of process test runs was conducted as follows. All process runs were conducted at atmospheric pressure.

A stirred tank equipped with a pitch blade turbine impeller was charged with 9 gallons of D.I. (deionized) water, the water was preheated to a starting temperature T0 (° C.) by injecting steam at a pressure of 130 psi, and the water was stirred by adjusting the agitator speed AS (rpm). The general process set up used for the test runs is illustrated in FIG. 1.

A continuous stream of an SBC solution similar to the quenched reaction mixture described in Example 6 of WO 2009/137678 was fed at a velocity Ve (m/s) to the preheated water from the top through a tube or nozzle having an ejection orifice diameter D (mm) for an ejection period te (min). The SBC contained 80 g/l of an SBC having an ion exchange capacity (IEC) of about 2.0 mol equivalent (meq) per gram in a mixture of cyclohexane (~63%-wt.) and heptanes (~37%-wt.). Throughout the ejection period te, the water temperature was maintained at about a steady temperature Ts (° C.) by controlled steam injections. Temperature fluctuations were monitored and the maximum temperature Tmax (° C.) was recorded.

At the end of the ejection period te, ejection of the SBC solution was stopped and stirring of the coagulation mixture at the steady temperature Ts was maintained for a holding period th (min).

Further specifics as well as the results of the test runs are compiled in the following Table 1:

TABLE 1

| Ex. | AS (rpm) | $T_0$ (° C.) | $D^{(a)}$ (mm) | $V_e$ (m/s) | $t_e$ (min) | $T_s$ (° C.) | $T_{max}$ (° C.) | $t_h$ (min) | Product | Comments |
|---|---|---|---|---|---|---|---|---|---|---|
| 1 | 160 | 80 | 2.8 | 3.58 | ~10 | 91.2 | 94 | 15 | 1/8" spherical | low rising manageable foam |
| 2 | 160 | 80 | 2.8 | 3.58 | 3 | — | 89 | — | no product collected | aborted due to severe foaming; 200 ppm 2-ethylhexanol (anti-foam) were ineffective |
| 3 | 160 | 80 | 2.8 | 4.03 | 10.5 | 89.3 | 92 | 15 | 1/8" spherical | manageable foam during holding period |
| 4 | 160 | 85 | 9.8$^{(b)}$ | 0.68 | 12 | 86 | 89 | 15 | | aborted; manageable foaming; coagulation mixture had pancake batter consistency |
| 5 | 160 | 85 | 9.8 | 0.68 | 10 | 86.1 | 89 | 15 | | aborted; initial foaming; coagulation mixture had pancake batter consistency |

TABLE 1-continued

| Ex. | AS (rpm) | $T_0$ (°C.) | $D^{(a)}$ (mm) | $V_e$ (m/s) | $t_e$ (min) | $T_s$ (°C.) | $T_{max}$ (°C.) | $t_h$ (min) | Product | Comments |
|---|---|---|---|---|---|---|---|---|---|---|
| 6 | 160 | 85 | 2.8 | 4.03 | 11.5 | 87 | 87 | 15 | | aborted; foaming; coagulation mixture had pancake batter consistency |
| 7 | 160 | 85 | 2.8 | 4.03 | 12.25 | 90.3 | 95.6 | 15 | | hybrid particle/slurry; manageable foaming |
| 8 | 160 | 80 | 2.8 | 3.58 | 15 | 92.5 | 92.5 | 15 | 1/8" spherical | initial foaming subsided during ejection period |
| 9 | 160 | 85 | 2.8 | 3.58 | 20 | 92.5 | 95 | 10 | 1/2" spherical | additional water added after 15 min ejection |
| 10 | 160 | 85 | 2.8 | 3.58 | 18 | 92.2 | 95 | 10 | 1/8" spherical | initial foaming subsided during ejection period |
| 11 | 180 | 85 | 2.8 | 3.31 | 15.7 | 92.6 | 92.6 | 10 | large pellets | |
| 12 | 150 | 85 | 2.8 | 3.76 | ~15 | 92.1 | 92.1 | 10 | very large pellets | after conclusion of the test, fouling was found in the nozzle |
| 13 | 150 | 85 | 1.8 | 8.29 | 15 | 92 | 92 | 2 | 1/8" spherical | initial foaming; ejection was interrupted until foaming subsided; ejection reinitiated at 94° C. |
| 14 | 150 | 90 | 1.8 | 8.29 | 18 | 92 | 92 | 2 | 1/8" spherical | no foaming |

Figure 2A:
FIGS. 2a and 2b illustrate the appearance of hydrated, mostly spherical SBC particles having a D50 of about ⅛" obtained in accordance with the process described herein.
Figure 2B:
Figure 3A:
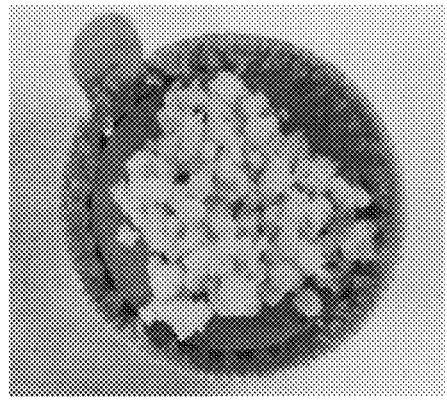
FIGS. 3a to 3f illustrate the appearance of the SBC particles prior to drying and after drying for 2, 3, 4, 5 and 6 hours, respectively.
Figure 3B:
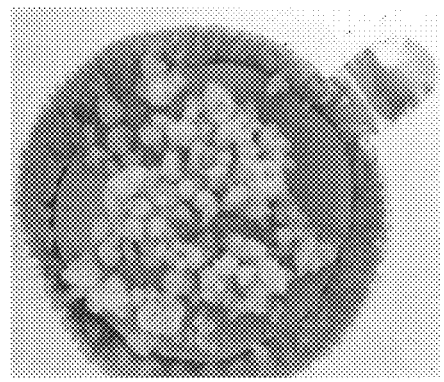
Figure 3C:
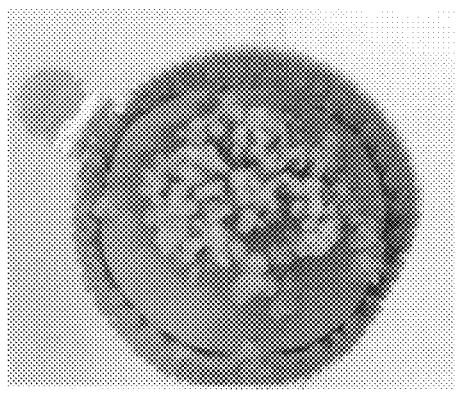
Figure 3D:
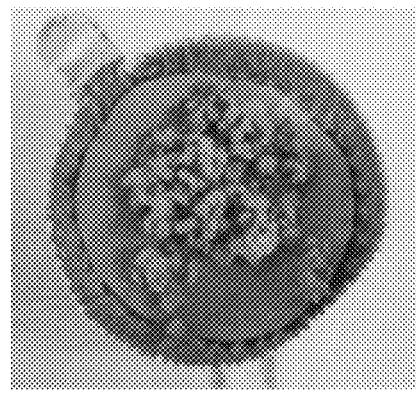
Figure 3E:
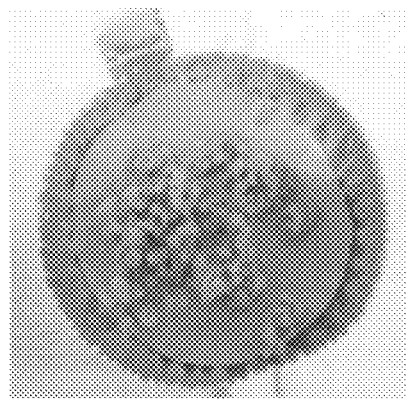
Figure 3F:
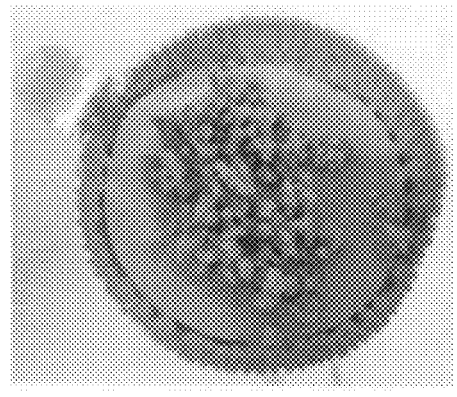

[a] unless indicated otherwise, the SBC solution was ejected onto the water surface
[b] the ejection nozzle was submerged in the water The coagulated SBC particles obtained in Examples 1, 3 and 8-14 were scooped from the coagulation mixture with a wire scooper. FIGS. 2a and 2b illustrate the appearance of wet, mostly spherical SBC particles having a D50 of about 1/8". FIG. 2b is an enlarged section of FIG. 2a.

Samples of the wet SBC particles were dried in a vacuum oven at 65° C. and 20" Hg vacuum for 7 hours. Constant weight was reached after about 6 hours. At this time, the SBC particles contained about 2%-wt. of residual moisture. In the course of drying, the initially white SBC particles turned beige and then brownish in color and became more brittle. The color changed back to the initial white color when the dried particles were re-hydrated. FIGS. 3a-3f illustrate the appearance of the SBC particles prior to drying and after drying for 2, 3, 4, 5 and 6 hours, respectively.

Figure 4:
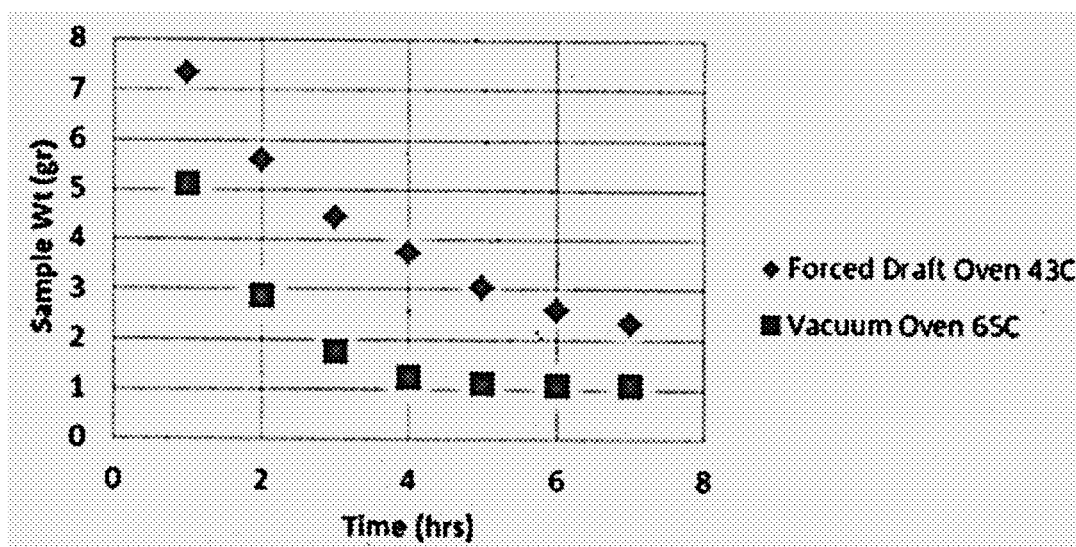
FIG. 4 shows the drying efficiency (weight loss of the SBC samples) when using a vacuum oven at 65° C. and 20" Hg vacuum and using a forced draft oven at 43° C.

Other samples of the wet SBC particles were dried in a forced draft oven at 43° C. FIG. 4 shows the drying efficiency (weight loss of the SBC samples) when using the vacuum oven at 65° C., 20" Hg vacuum and a slight $N_2$ purge, and the forced draft oven at 43° C.

What is claimed is:

1. A process for coagulating a sulfonated block copolymer from a solution comprising the block copolymer and one or more organic solvents, the process comprising:
   (a) an ejection stage which comprises ejecting the copolymer solution into or onto moderately stirred water to form a coagulation mixture, wherein
      the ejected copolymer solution is substantially free of steam; and
      the water is at an operating pressure and is at an operating temperature below its boiling point; and
   (b) a holding stage which comprises subjecting the coagulation mixture formed in stage (a) to moderate stirring at a holding pressure and at a holding temperature below the boiling point of water for a period sufficient to substantially completely evaporate the one or more organic solvents.

2. The process of claim 1, wherein the copolymer solution has a copolymer concentration of about 8 g/l to about 140 g/l.

3. The process of claim 1, wherein the copolymer solution consists essentially of from about 0.5 to about 30%-wt. of the copolymer,
   from about 60 to about 99.5%-wt. of the one or more organic solvents, and
   up to about 10%-wt. of by-products and/or impurities.

4. The process of claim 1, wherein, at the operating pressure, the boiling point of the one or more organic solvents is below the boiling point of water.

5. The process of claim 1, wherein the boiling point of the one or more organic solvents at atmospheric pressure is less than 100° C.

6. The process of claim 1, wherein at least one of the one of more organic solvents of the copolymer solution has one or more of the following properties:
   i) the solvent is a hydrophobic solvent; and/or
   ii) the solvent is an apolar solvent; and/or
   iii) the solvent has a boiling point in the range of from about 45° C. to about 99° C. at standard atmospheric pressure; and/or
   iv) the solvent has a density of at most 1 g/cm$^3$; and/or
   v) at most 2 g of the solvent is soluble in 1 l of water at about 25° C.

7. The process of claim 1, wherein the operating temperature in stage (a) is such that the one or more organic solvents have a vapor pressure which is greater than about 70% of the stage (a) operating pressure.

8. The process of claim 1, wherein the copolymer solution is ejected continuously or intermittently as a non-atomized stream.

9. The process of claim 1, wherein the copolymer solution is ejected onto the water surface at a region of the surface having low shear stress.

10. The process of claim 1, wherein the copolymer solution is ejected at a velocity of from about 0.3 m/s to about 10 m/s.

11. The process of claim 10, wherein the copolymer solution is ejected at a velocity of from about 0.3 m/s to about 5 m/s.

12. The process of claim 1, wherein the holding temperature in stage (b) is below the boiling point of water at the holding pressure and the holding temperature is equal to, or greater than, the operation temperature in stage (a) when the holding pressure is equal to, or greater than, the operating pressure.

13. The process of claim 1 for producing a coagulate of the copolymer comprising coagulated copolymer in form of discrete hydrated copolymer particles having a D50 of from about 185 μm to about 25 mm.

14. The process of claim 13, wherein the D50 is from about 300 μm to about 600 μm.

15. The process of claim 1, wherein the copolymer has at least one end block A and at least one interior block B wherein each A block contains essentially no sulfonic acid or sulfonate functional groups and each B block is a polymer block containing from about 10 to about 100 mol-% sulfonic acid or sulfonate functional groups based on the number of monomer units of the B block.

16. The process of claim 15, wherein each B block comprises segments of one or more vinyl aromatic monomers selected from polymerized (i) unsubstituted styrene monomers, (ii) ortho-substituted styrene monomers, (iii) meta-substituted styrene monomers, (iv) alpha-methylstyrene, (v) 1,1-diphenylethylene, (vi) 1,2-diphenylethylene and (vii) mixtures thereof.

17. The process of claim 15, wherein the copolymer has a general configuration A-B-A, A-B-A-B-A, $(A-B-A)_xX$, $(A-B)_xX$, A-D-B-D-A, A-B-D-B-A, $(A-D-B)_xX$, $(A-B-D)_xX$ or mixtures thereof, where n is an integer from 2 to about 30, and X is a coupling agent residue and wherein each D block is a polymer block resistant to sulfonation and the plurality of A blocks, B blocks, or D blocks are the same or different.

18. The process of claim 15, wherein the copolymer comprises one or more blocks D each block D being independently selected from the group consisting of (i) a polymerized or copolymerized conjugated diene selected from isoprene, 1,3-butadiene having a vinyl content prior to hydrogenation of between 20 and 80 mol percent, (ii) a polymerized acrylate monomer, (iii) a silicon polymer, (iv) polymerized isobutylene and (v) mixtures thereof, wherein any segments containing polymerized 1,3-butadiene or isoprene are subsequently hydrogenated.

* * * * *